United States Patent
Shimada

(10) Patent No.: US 8,199,535 B2
(45) Date of Patent: Jun. 12, 2012

(54) SWITCHING POWER SOURCE APPARATUS

(75) Inventor: Masaaki Shimada, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 399 days.

(21) Appl. No.: 12/540,826

(22) Filed: Aug. 13, 2009

(65) Prior Publication Data

US 2010/0039835 A1 Feb. 18, 2010

(30) Foreign Application Priority Data

Aug. 18, 2008 (JP) ................................. 2008-209666

(51) Int. Cl.
*H02M 3/335* (2006.01)

(52) U.S. Cl. ..................... 363/21.02; 363/21.16; 323/235
(58) Field of Classification Search ............... 363/21.02, 363/21.03, 21.16; 323/235, 319
See application file for complete search history.

(56) References Cited

U.S. PATENT DOCUMENTS

| | | | |
|---|---|---|---|
| 6,587,361 B2 * | 7/2003 | Preller | 363/97 |
| 6,654,258 B2 * | 11/2003 | Imamura | 363/21.02 |
| 7,035,119 B2 | 4/2006 | Koike | |
| 7,394,670 B2 * | 7/2008 | Koike | 363/21.16 |
| 2004/0125620 A1 * | 7/2004 | Yamashita | 363/21.01 |

FOREIGN PATENT DOCUMENTS

WO    WO 2004/023634 A1    3/2004

* cited by examiner

*Primary Examiner* — Harry Behm
(74) *Attorney, Agent, or Firm* — Oblon, Spivak, McClelland, Maier & Neustadt, L.L.P.

(57) ABSTRACT

A switching power source apparatus has a controller generating a drive signal that controls an ON/OFF period of a switching element 3. The controller includes a load tester for testing the switching power source apparatus when detecting an edge of the drive signal after the switching element is switched from ON to OFF, a bottom detector of the switching element during an OFF period thereof, a bottom skip state tester, and a bottom skip operation tester carrying out a pseudo resonant operation that turns on the switching element at a first minimum voltage point if the apparatus is in a heavy load state, and if the apparatus is in the light load state and if the bottom skip state has continued for a first predetermined time, shift the pseudo resonant operation to a bottom skip operation.

5 Claims, 11 Drawing Sheets

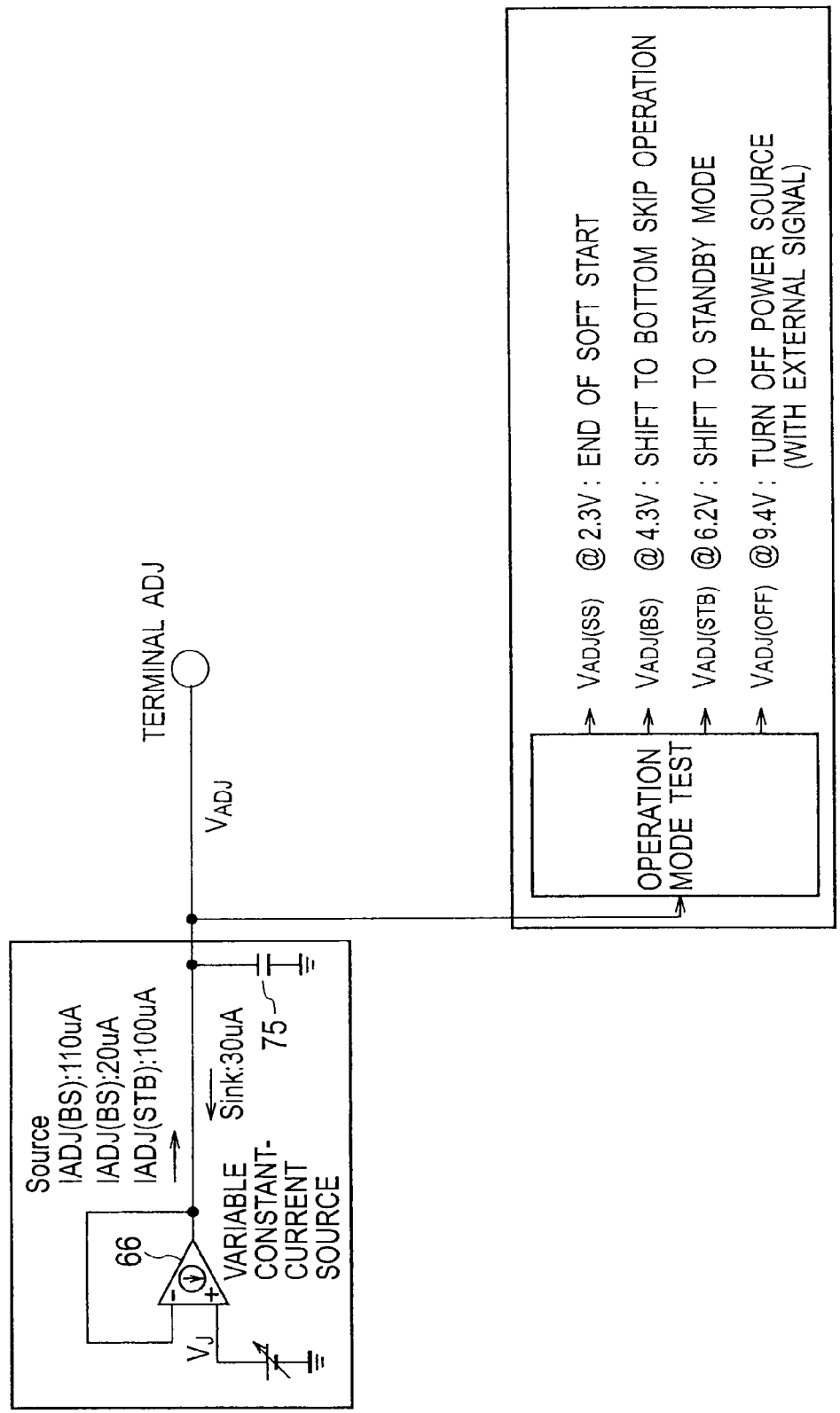

SWITCHING POWER SOURCE APPARATUS

BACKGROUND OF THE INVENTION

1. Field of the Invention

The present invention relates to switching power source apparatuses used for consumer appliances and audio equipment, and particularly, to a switching power source apparatus capable of stably operating even on input and output variations and preventing magnetostrictive noise.

2. Description of the Related Art

FIG. 1 is a circuit diagram illustrating a switching power source apparatus according to a related art. This apparatus performs a pseudo resonant operation. In FIG. 1, a rectifier 1c and a smoothing capacitor 1d form a rectifying-smoothing circuit 1 that rectifies and smoothes an AC voltage from an AC power source into a DC voltage. Both ends of the smoothing capacitor 1d are connected to a series circuit that includes a primary winding P of a transformer 2 and a switching element 3 made of a MOSFET. A current detecting resistor 9 (current detector) detects a current passing through the primary winding of the transformer 2 or the switching element 3 and outputs a current detected signal to a turn-off controller 25a.

Both ends of a secondary winding S of the transformer 2 are connected to a series circuit including a diode 4 and a smoothing capacitor 5. The smoothing capacitor 5A provides a DC output voltage Vout. The diode 4 and smoothing capacitor 5 form an output rectifying-smoothing circuit. A voltage detector 7 detects a voltage across the smoothing capacitor 5, i.e., the DC output voltage Vout, finds an error between the detected DC output voltage Vout and a reference voltage, and sends the error as an error signal to the turn-off controller 25a on the primary side.

A controller 8 generates a drive signal that controls an ON/OFF period of the switching element 3 so as to substantially keep the DC output voltage Vout constant. The controller 8 includes a power source start/stop circuit (Reg+Start/Stop) 24, the turn-off controller 25a, a bottom detector 41, and an R-S flip-flop 23.

The power source start/stop circuit 24 activates each part with a voltage from the smoothing capacitor 1d passed through a resistor 10, and after the activation, operates each part with a voltage from an auxiliary winding D rectified and smoothed through a diode 11 and a capacitor 12. The power source start/stop circuit 24 also has a function of stopping each part.

The turn-off controller 25a generates an OFF signal to turn off the switching element 3 according to the error signal from the voltage detector 7 and the current detected signal from the current detecting resistor 9 and sends the OFF signal to a reset terminal R of the R-S flip-flop 23. The bottom detector 41 serves to reduce a switching loss when the switching element 3 turns on. According to a voltage generated by the auxiliary winding D of the transformer 2, the bottom detector 41 detects a bottom in an oscillation of a drain-source voltage Vds of the switching element 3, generates an ON signal to turn on the switching element 3, and sends the ON signal to a set terminal S of the R-S flip-flop 23.

The switching power source apparatus of FIG. 1 that performs a pseudo resonant operation increases, in principle, a switching frequency under light load, to deteriorate efficiency.

The global warming in recent years requires energy saving measures such as efficiency improvement to be taken. FIG. 2 is a circuit diagram illustrating a switching power source apparatus disclosed in International Patent Application Publication No. WO2004/023634. This apparatus carries out a bottom skip operation. Namely, as illustrated in FIG. 3, the turn-on timing of a switching element 3 is delayed under light load with the use of the ringing of a drain-source voltage Vds of the switching element 3 during an OFF period of the switching element 3, to thereby extend the OFF period, suppress an increase in a switching frequency, decrease a switching loss, and improve efficiency under light load.

The switching power source apparatus of FIG. 2 consists of an externally excited flyback DC-DC converter having a controller 8. Operation of this apparatus will be explained.

Under heavy to normal load, an output signal $V_{LD}$ of a D flip-flop 28 is high as illustrated in FIG. 3(E). In synchronization with a first fall edge of an output signal $V_{BD}$ (FIG. 3(D)) of a bottom detector 41, an output terminal Q of a first D flip-flop 50 of a bottom skip controller 42 outputs a single pulse of signal $V_{DF1}$. As a result, in synchronization with the first fall edge of the output signal $V_{BD}$ of the bottom detector 41, an AND gate 52 outputs a single pulse of AND signal $V_{AD}$ that increases to a high level.

At this time, an output terminal Q of a second D flip-flop 51 of the bottom skip controller 42 outputs a low-level signal $V_{DF2}$. Accordingly, in synchronization with the first fall edge of the output signal $V_{BD}$ of the bottom detector 41, an OR gate 53 outputs a single pulse of OR signal VOR that increases to high to set an R-S flip-flop 23.

As illustrated in FIGS. 3(D) and 3(C), in synchronization with the first fall edge of the output signal $V_{BD}$ of the bottom detector 41, a drive signal $V_G$ provided by the R-S flip-flop 23 to a gate terminal of the switching element 3 changes from low to high to turn on the switching element 3.

At this time, a drain current ID (FIG. 3(B)) to the switching element 3 linearly increases and a voltage VOCP at a connection point between level shifting resistors 17 and 18 linearly decreases below a high reference voltage $V_{DTH}$ as illustrated in FIG. 3(F). When the voltage VOCP reaches the voltage level of a detection signal $V_{FB}$ from an output voltage detector 7, a current mode controlling comparator 20 outputs a high-level signal V2 to reset the R-S flip-flop 23.

As results, the drive signal $V_G$ from the R-S flip-flop 23 to the gate terminal of the switching element 3 changes from high to low as illustrated in FIG. 3(C), to change the switching element 3 from ON to OFF. In this way, under heavy to normal load, a pseudo resonant operation is carried out to turn on the switching element 3 at the time when the transformer 2 completely discharges flyback energy and the drain-source voltage Vds of the switching element 3 reaches a minimum point (bottom point).

If the load becomes lighter, the output signal $V_{LD}$ of the D flip-flop 28 changes from high to low as illustrated in FIG. 3(E). Then, as illustrated in FIG. 3(B), a maximum value of the drain current ID to the switching element 3 slightly becomes higher, and as illustrated in FIG. 3(F), a peak of the voltage VOCP at the connection point of the level shifting resistors 17 and 18 slightly moves downward.

At this time, a voltage level changer 31 changes a reference voltage supplied to a non-inverting input terminal of a current detecting comparator 27 from the high reference voltage $V_{DTH}$ to a low reference voltage $V_{DTL}$ as illustrated in FIG. 3(F). At this time, in synchronization with a second fall edge of the output signal $V_{BD}$ of the bottom detector 41 illustrated in FIG. 3(D), the output terminal Q of the second D flip-flop 51 of the bottom skip controller 42 outputs a single pulse of signal $V_{DF2}$.

Since the AND gate 52 outputs a low-level signal $V_{AD}$, the OR gate 53 outputs, in synchronization with the second fall edge of the output signal $V_{BD}$ of the bottom detector 41, a single pulse of OR signal VOR that increases to high to set the R-S flip-flop 23.

Consequently, the drive signal $V_G$ supplied to the gate terminal of the switching element 3 from the R-S flip-flop 23 in synchronization with the second fall edge of the output signal $V_{BD}$ of the bottom detector 41 changes from low to high as illustrated in FIGS. 3(D) and 3(C), to turn on the switching element 3. The drain current ID to the switching element 3 linearly increases as illustrated in FIG. 3(B) and the voltage VOCP at the connection point of the level shifting resistors 17 and 18 linearly decreases.

At this time, the detection signal $V_{FB}$ from the output voltage detector 7 is higher than the low reference voltage $V_{DTL}$ as illustrated in FIG. 3(F), and therefore, the voltage VOCP at the connection point of the level shifting resistors 17 and 18 does not reach the low reference voltage $V_{DTL}$. When the voltage VOCP reaches the level of the detection signal $V_{FB}$, the current mode controlling comparator 20 outputs a high-level signal V2 to reset the R-S flip-flop 23.

As a result, the drive signal $V_G$ from the R-S flip-flop 23 to the gate terminal of the switching element 3 changes from high to low as illustrated in FIG. 3(C), to change the switching element 3 from ON to OFF. In this way, the bottom skip operation is carried out under light load, to turn on the switching element 3 at a second minimum point of the drain-source voltage Vds of the switching element 3 during an OFF period of the switching element 3.

FIG. 4 illustrates an oscillation state with respect to a load ratio of the externally excited flyback DC-DC converter having the controller 8 of FIG. 2. The "load ratio" is a ratio of power consumed by load to power provided by the converter to the load. A load ratio of 50% to 100% corresponds to normal to heavy load under which the pseudo resonant operation is carried out. A load ratio of 0% to 70% corresponds to normal to light load under which the bottom skip operation is carried out.

When the load ratio decreases from 100% to 50%, the pseudo resonant operation is shifted to the bottom skip operation, which is continued up to no-load state such as a standby state in which the load ratio is 0%. If the load ratio changes from 0% to 70%, the bottom skip operation is shifted to the pseudo resonant operation, which is continued up to a load ratio of 100%.

Under light load, the switching power source apparatus of the related art illustrated in FIG. 2 uses the bottom skip controller 42 to turn on the switching element 3 at every second minimum point of the drain-source voltage Vds of the switching element 3. This elongates an OFF period of the switching element 3 and decreases the switching frequency of the switching element 3. Namely, the number of times of switching of the switching element 3 decreases to reduce a switching loss under light load and improve the conversion efficiency of the switching power source apparatus for a wide range of load.

Under light load, flyback energy of the transformer 2 is supplied within a relatively short period after the turning-off of the switching element 3 to a load (not illustrated) from the secondary winding 2b through the output rectifying-smoothing circuit 6. This produces narrow-width voltage pulses (Vds) containing free oscillation portions between the drain and source of the switching element 3 as illustrated in FIGS. 3(A) and 4(A).

Accordingly, when the load is light, the bottom skip controller 42 carries out the bottom skip operation to turn on the switching element 3 whenever the bottom detector 41 detects a second minimum point in the drain-source voltage Vds. The bottom skip operation elongates an OFF period of the switching element 3 and decreases the oscillation frequency thereof.

Under heavy to normal load, flyback energy of the transformer 2 is supplied within a relatively long period after the turning-off of the switching element 3 to the load (not illustrated) from the secondary winding 2b through the rectifying-smoothing circuit 6. This generates wide-width voltage pulses (Vds) between the drain and source of the switching element 3.

Accordingly, when the load is heavy to normal, the bottom skip controller 42 carries out the pseudo resonant operation to turn on the switching element 3 whenever the bottom detector 41 detects a first minimum point in the drain-source voltage Vds. The pseudo resonant operation changes the switching element 3 from OFF to ON when flyback energy of the transformer 2 is completely discharged and the drain-source voltage Vds of the switching element 3 reaches a minimum point (bottom point).

SUMMARY OF THE INVENTION

The switching power source apparatus of the above-mentioned related art involves a mixture of operating states due to load variations and input voltage variations, such as the bottom skip operation under light load, the pseudo resonant operation under heavy load with a current exceeding a rated current, the bottom skip operation under a high input voltage, and the pseudo resonant operation under a low input voltage.

FIG. 4 illustrates operation of the related art of FIG. 2 under varying operating states that a rated load current changes to a light load current. In this case, the switching frequency and switching current Id of the switching element 3 greatly vary to generate irritating magnetostrictive noise from the transformer 2. Such noise is troublesome in consumer appliances and audio equipment.

The present invention provides a switching power source apparatus capable of carrying out the bottom skip operation without causing magnetostrictive noise from a transformer even under load and input varying situations.

According to a first aspect of the present invention, the switching power source apparatus includes a series circuit connected to both ends of a DC power source and including a primary winding of a transformer and a switching element; a current detector configured to detect a current passing through one of the primary winding of the transformer and the switching element; an output rectifying-smoothing circuit configured to rectify and smooth a voltage generated by a secondary winding of the transformer and provide a DC output voltage; and a controller configured to generate a drive signal that controls an ON/OFF period of the switching element in such a way as to keep the DC output voltage at a predetermined value. The controller includes an edge detector configured to detect an edge of the drive signal when the switching element is switched from ON to OFF; a load tester configured to test, when the edge detector detects an edge of the drive signal, whether or not the switching power source apparatus is in a light load state according to a reference voltage and a voltage derived from a detection signal provided by the current detector; a bottom detector configured to detect a minimum point in a voltage across the switching element during an OFF period of the switching element; a bottom skip state tester configured to test, according to an output from the load tester, whether or not a bottom skip state has continued for a first predetermined time, the bottom skip state being asserted if the output of the load tester indicates the light load state; and a bottom skip operation tester. The bottom skip operation tester is configured to, if the load tester indicates that the apparatus is in a heavy load state, carry out a pseudo resonant operation that turns on the switching element at a first minimum point detected by the bottom detector, and if the load tester indicates the light load state and the bottom skip state tester indicates that the bottom skip state has continued for the first predetermined time, determine that a bottom skip operation must be carried out and shift the pseudo resonant operation to the bottom skip operation that turns on the switching element at a second or later minimum point detected by the bottom detector.

According to a second aspect of the present invention, the bottom skip state tester includes a variable voltage part configured to change, if the load tester indicates the light load state, a first voltage to a second voltage that is larger than the first voltage; a capacitor; a current source configured to pass a current corresponding to the second voltage set by the variable voltage part to the capacitor; and a time tester configured to determine that the bottom skip state has continued for the first predetermined time when a voltage across the capacitor charged by the current source reaches the second voltage from the first voltage.

According to a third aspect of the present invention, the bottom skip state tester includes a counter configured to start counting the first predetermined time when the load tester indicates the light load state and a time tester configured to determine that the bottom skip state has continued for the first predetermined time when the counter counts the first predetermined time.

According to a fourth aspect of the present invention, the switching power source apparatus further includes a standby state tester configured to test, according to an output from the bottom skip state tester, whether or not a standby state has continued for a second predetermined time, the standby state being a state in which load on the switching power source apparatus is lighter than in the light load state; and a standby operation unit configured to start a standby operation when the standby state has continued for the second predetermined time, the standby operation fixing the bottom skip operation and carrying out an intermittent oscillation operation.

Any one of the above-mentioned aspects of the present invention monitors a load state of the switching power source apparatus, and according to a result of the monitoring, shifts the pseudo resonant operation and bottom skip operation from one to another with a delay time placed before shifting the operation. Even if there is an input variation or a load variation, each aspect of the present invention secures a stable switching operation and gently changes a peak current passed to the switching element, to avoid a sudden current change on the switching element and prevent the transformer from producing magnetostrictive noise.

BRIEF DESCRIPTION OF THE DRAWINGS

FIG. 11 is a schematic view illustrating a variable constant-current source applicable to Embodiments 1 and 2.

DESCRIPTION OF THE PREFERRED EMBODIMENT

Switching power source apparatuses according to embodiments of the present invention will be explained in detail with reference to the drawings.

Embodiment 1

Figure 5:
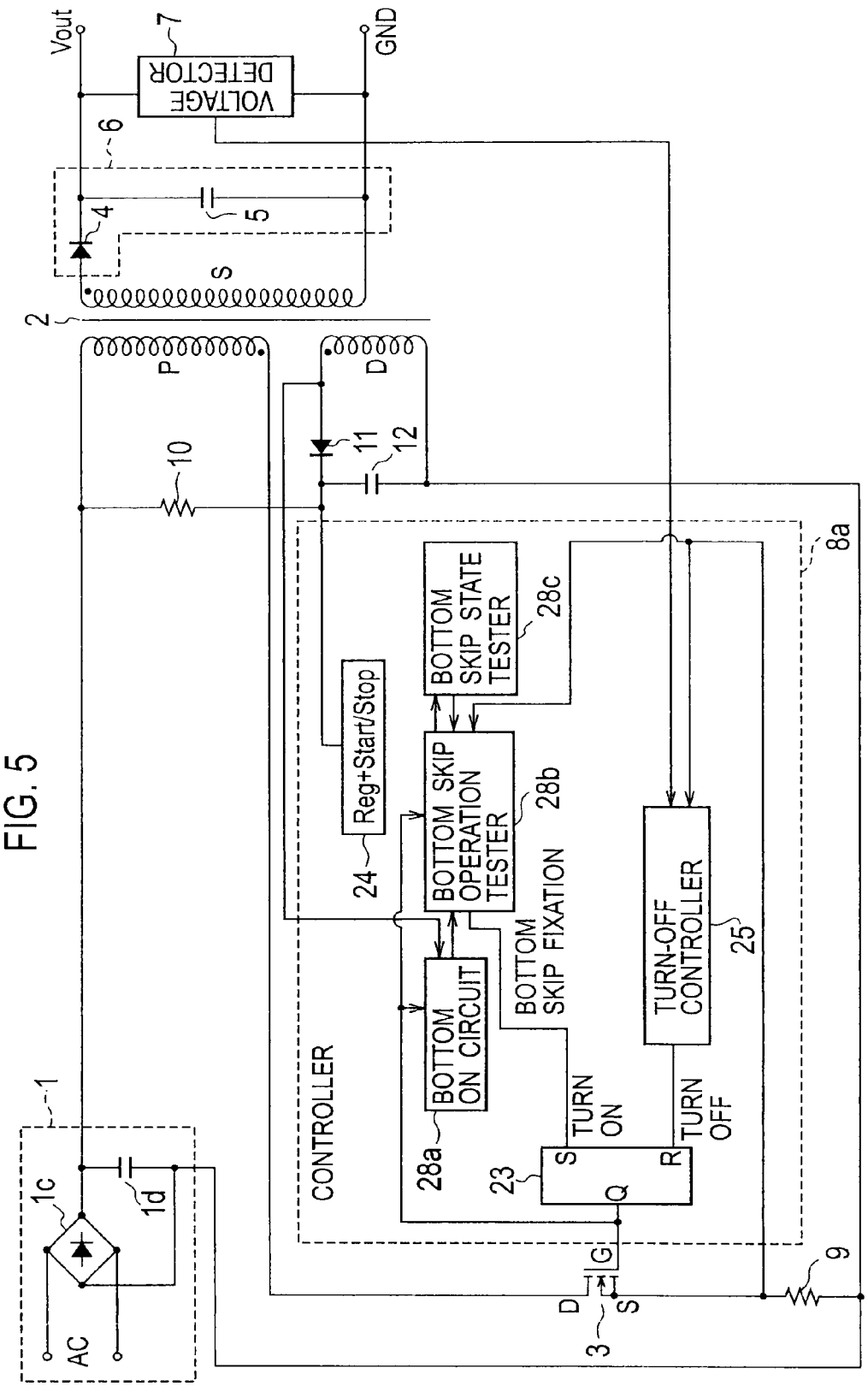
FIG. 5 is a circuit diagram illustrating a switching power source apparatus according to Embodiment 1 of the present invention.

FIG. 5 is a circuit diagram illustrating a switching power source apparatus according to Embodiment 1 of the present invention. This switching power source apparatus is an externally excited flyback DC-DC converter and differs from the switching power source apparatus of the related art illustrated in FIG. 1 in the configuration of a controller 8a that generates a drive signal to control an ON/OFF period of a switching element 3 in such a way as to substantially keep a DC output voltage Vout constant.

Figure 1:
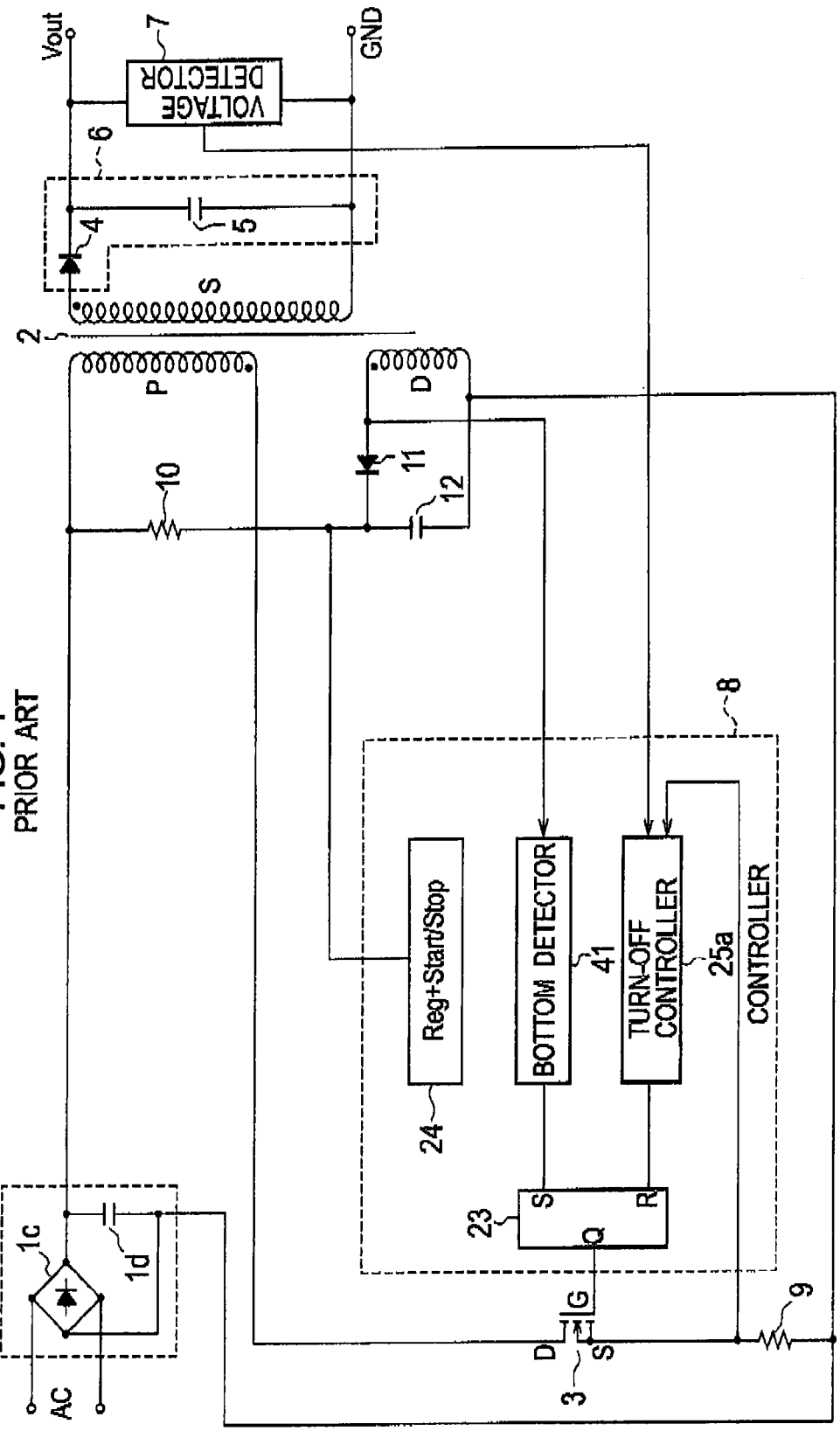
FIG. 1 is a circuit diagram illustrating a switching power source apparatus according to a related art.
Figure 2:
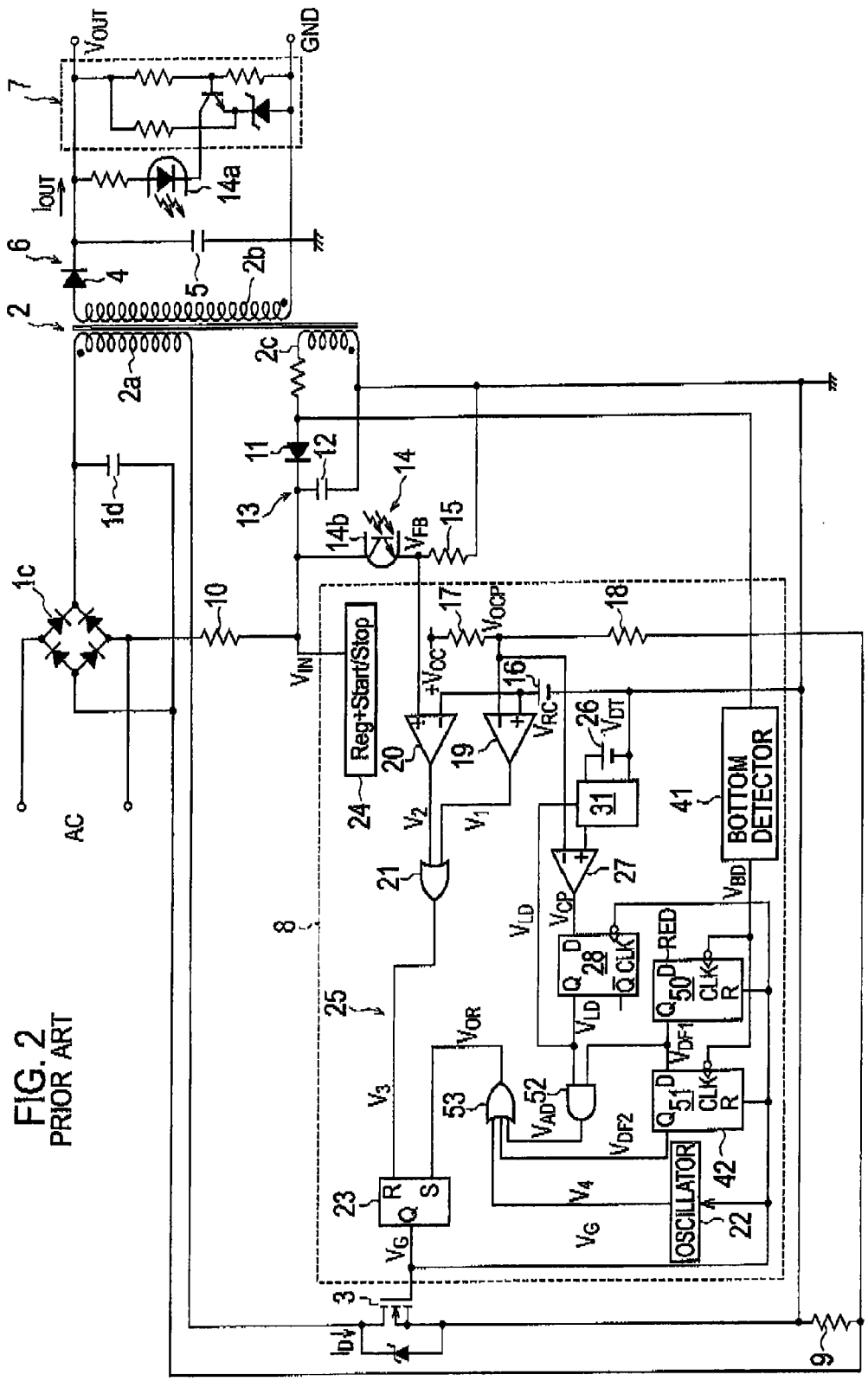
FIG. 2 is a circuit diagram illustrating a switching power source apparatus according to another related art.
Figure 3:
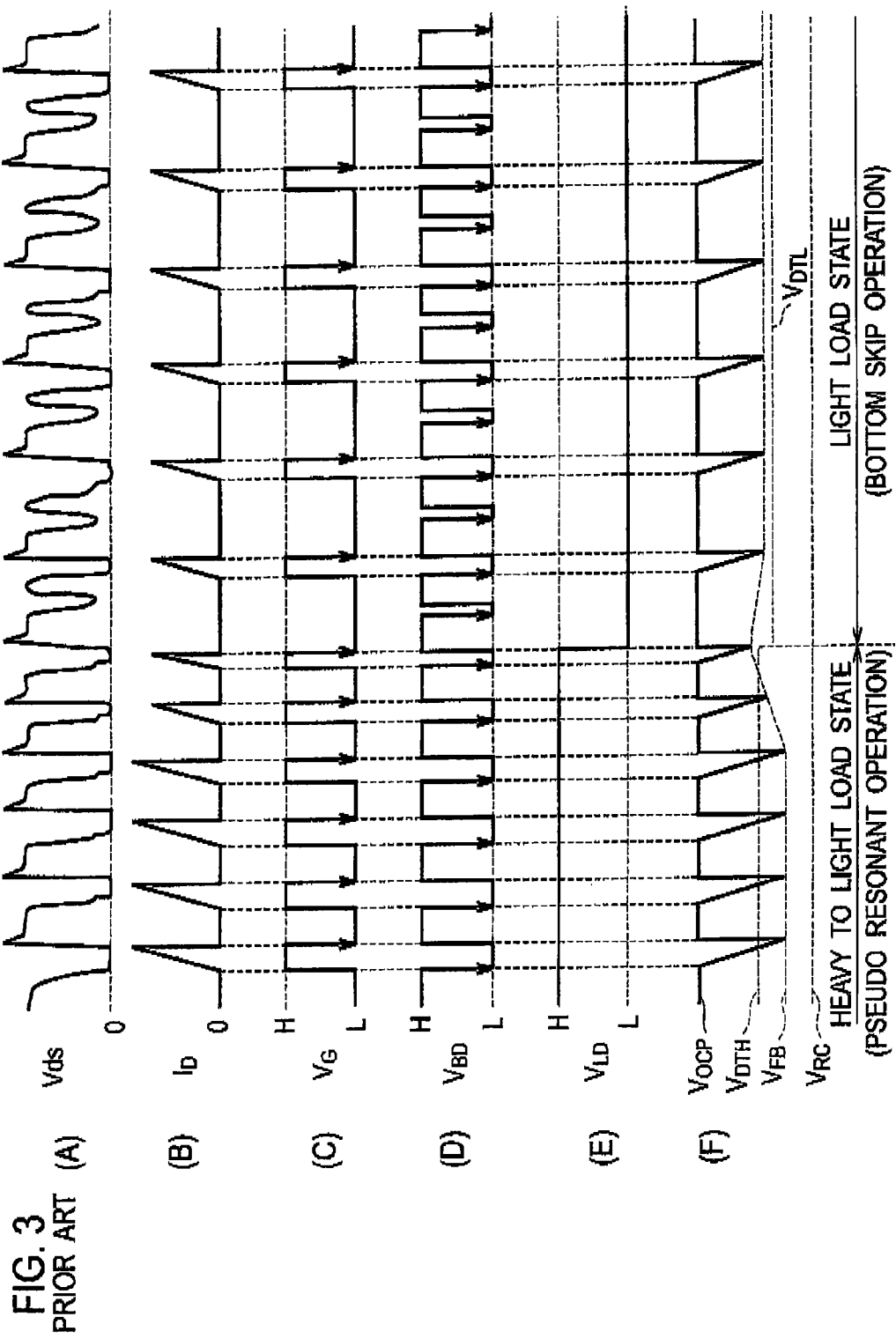
FIG. 3 is a timing chart illustrating operation of the switching power source apparatus of FIG. 2.
Figure 4:
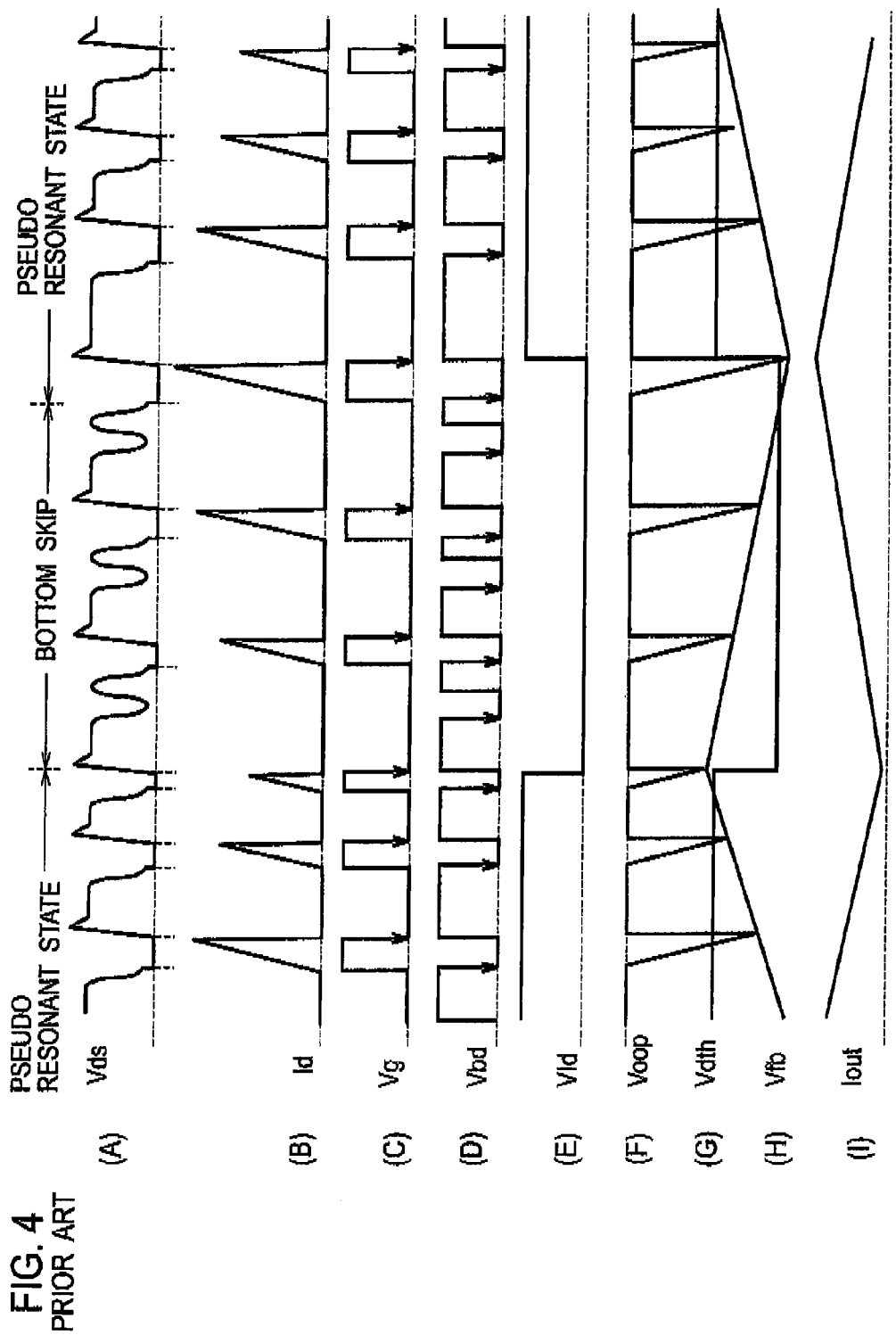
FIG. 4 is a timing chart illustrating operation of the switching power source apparatus of FIG. 2 under various load conditions.

The other parts illustrated in FIG. 5 are the same as those illustrated in FIG. 1, and therefore, are represented with like reference numerals to omit their explanations.

In FIG. 5, the controller 8a includes a power source start/stop circuit (Reg+Start/Stop) 24, a turn-off controller 25, a bottom ON circuit 28a, a bottom skip operation tester 28b, a bottom skip state tester 28c, and an R-S flip-flop 23.

Figure 6:
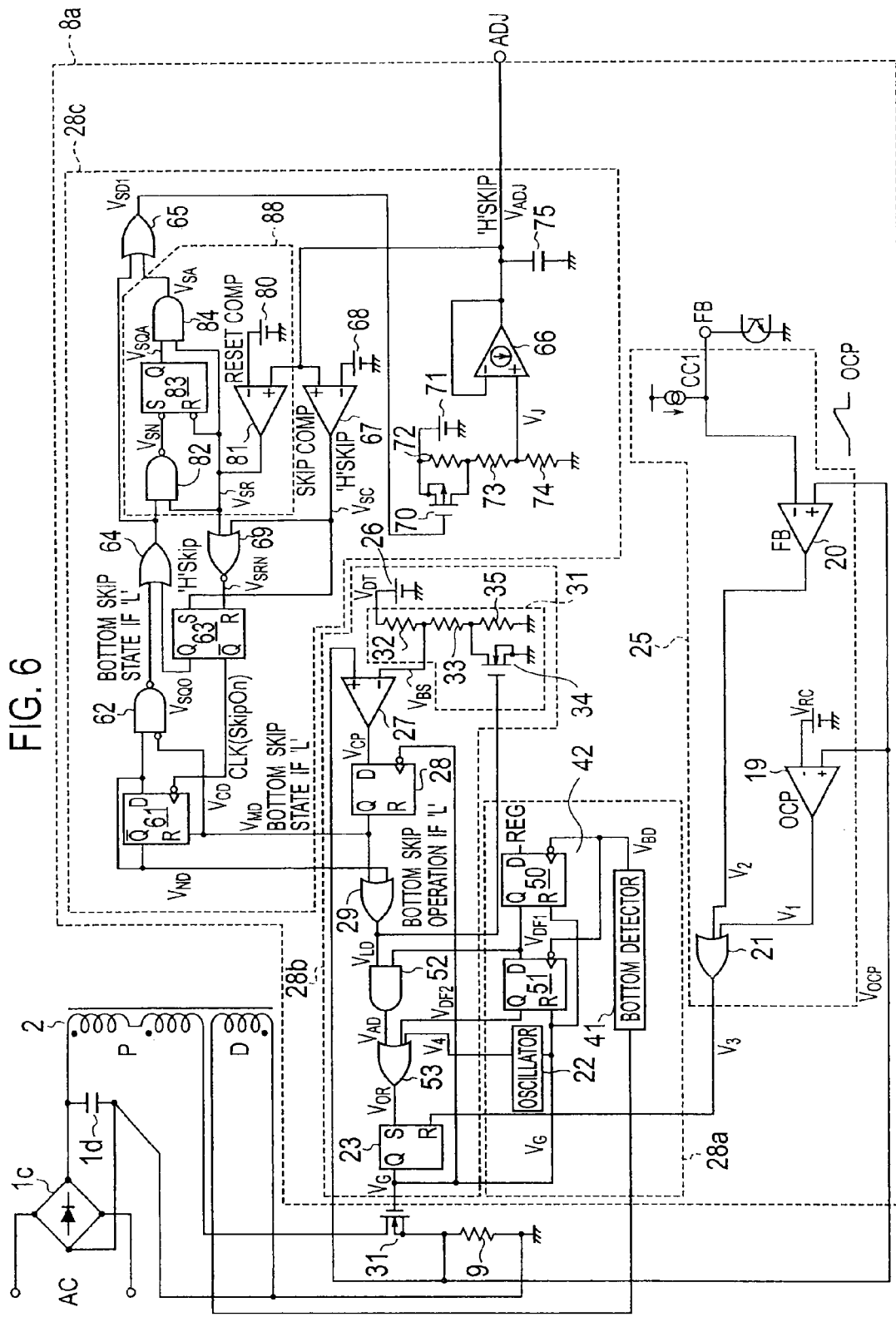
FIG. 6 is a circuit diagram illustrating a controller in the switching power source apparatus of Embodiment 1.

FIG. 6 is a circuit diagram illustrating the details of the controller 8a. The bottom skip operation tester 28b includes a comparator 27 that compares a reference voltage with a voltage derived from a current detected signal provided by a current detecting resistor (current detector) 9, a D flip-flop (edge detector, load tester) 28 that detects an edge of a drive signal when the switching element 3 is changed from ON to OFF, and if an edge of the drive signal is detected, tests whether or not the switching power source apparatus is in a light load state according to an output from the comparator 27, an OR gate 29, resistors 32, 33, and 35, a MOSFET 34, an AND gate 52, and an OR gate 53.

The bottom skip state tester 28c includes a D flip-flop 61, a NAND gate 62, an R-S flip-flop 63, OR gates 64 and 65, a constant current operational amplifier 66, a MOSFET 70, a power source 71, resistors 72, 73, and 74, a skip comparator 67, a reference voltage 68, a NOR gate 69, a reference voltage 80, a comparator 81, a NAND gate 82, an R-S flip-flop 83, and an AND gate 84. According to an output from the D flip-flop 28, the bottom skip state tester 28c tests if a bottom skip state, which is created if the apparatus is in the light load state, has continued for a first predetermined time and provides the OR gate 29 with a result of the test.

The MOSFET 70, power source 71, and resistors 72 to 74 form a variable voltage part. If the switching power source apparatus is in the light load state, the variable voltage part turns on the MOSFET 70 and changes a threshold voltage for the constant current operational amplifier 66 from 3 V (first voltage) to 4.3 V (second voltage). The constant current operational amplifier 66 acting as a current source passes a current corresponding to the changed voltage of 4.3V to a capacitor 75. When a voltage across the capacitor 75 increases from 3 V and reaches 4.3 V, the skip comparator (time tester) 67 determines that the bottom skip state has continued for the first predetermined time and provides a high-level output.

The bottom ON circuit 28a includes a bottom detector 41 that detects, according to a voltage of an auxiliary winding D, a minimum point in a voltage across the switching element 3 during an OFF period of the switching element 3, a first D flip-flop 50, a second D flip-flop 51, and a pulse generator 22. The first and second D flip-flops 50 and 51 form a bottom skip controller 42.

The bottom skip operation tester 28b employs the OR gate 29, AND gate 52, OR gate 53, and the first and second D flip-flops 50 and 51 of the bottom ON circuit 28a, to carry out a pseudo resonant operation and a bottom skip operation. If an output from the D flip-flop 28 indicates that the switching power source apparatus is in a heavy load state, the bottom skip operation tester 28b achieves the pseudo resonant operation that turns on the switching element 3 at a first minimum point detected by the bottom detector 41. If outputs from the D flip-flops 28 and 61 indicate that the apparatus is in the light load state and the bottom skip state has continued for the first predetermined time, the bottom skip operation tester 28b determines that the bottom skip operation is carried out and shifts the pseudo resonant operation to the bottom skip operation that turns on the switching element 3 at a second or later minimum point detected by the bottom detector 41.

The turn-off controller 25 includes a constant current source CC1, a comparator 19, a current mode controlling comparator 20, and an OR gate 21. According to an error signal from a voltage detector 7 and a current detected signal from the current detecting resistor 9, the turn-off controller 25 generates a drive signal to control an ON/OFF period of the switching element 3 and supplies the drive signal to a reset terminal of the R-S flip-flop 23, which provides an output signal from an output terminal Q to turn on/off the switching element 3.

Operation of the controller 8a illustrated in FIG. 6 will be explained. In a heavy-to normal load state, the comparator 27 provides a high-level output, the D flip-flop 28 provides an output signal $V_{MD}$ of high level, and the OR gate 29 provides an output signal $V_{LD}$ of high level. In synchronization with a first fall edge of an output signal $V_{BD}$ from the bottom detector 41, an output terminal Q of the first D flip-flop 50 of the bottom skip controller 42 outputs a single pulse signal $V_{DF1}$.

In synchronization with the first fall edge of the output signal $V_{BD}$ from the bottom detector 41, the AND gate 52 outputs a single pulse AND signal $V_{AD}$ that increases up to high level. At this time, an output terminal Q of the second D flip-flop 51 of the bottom skip controller 42 outputs a low-level signal $V_{DF2}$. As a result, in synchronization with the first fall edge of the output signal $V_{BD}$ from the bottom detector 41, the OR gate 53 outputs a single pulse OR signal VOR that increases up to high level to set the R-S flip-flop 23.

Consequently, in synchronization with the first fall edge of the output signal $V_{BD}$ from the bottom detector 41, the drive signal $V_G$ provided by the R-S flip-flop 23 to the gate terminal of the switching element 3 changes from low to high to turn on the switching element 3.

Then, a drain current ID to the switching element 3 linearly increases and a voltage VOCP of the current detecting resistor 9 linearly increases. When the voltage VOCP at a connection point of the current detecting resistor 9 reaches the voltage level of a detection signal $V_{FB}$ from the output voltage detector 7, the current mode controlling comparator 20 outputs a high-level signal V2 to the OR gate 21 to the reset terminal R of the R-S flip-flop 23, to reset the R-S flip-flop 23.

Then, the drive signal $V_G$ provided by the R-S flip-flop 23 to the gate terminal of the switching element 3 changes from high to low to change the switching element 3 from ON to OFF. In this way, in the heavy to normal load state, the pseudo resonant operation is carried out to turn on the switching element 3 when the transformer 2 completely discharges flyback energy and when a drain-source voltage Vds of the switching element 3 reaches a minimum point (bottom point).

Whenever the switching element 3 continues an OFF state for a predetermined time, the pulse generator 22 generates a pulse signal V4 to generate an ON signal that makes the switching element 3 start a switching operation at the start of the power source.

If the load on the apparatus becomes lighter, the drain current ID to the switching element 3 decreases the maximum value thereof and the output $V_{CP}$ of the comparator 27 changes from high to low.

Figure 7:
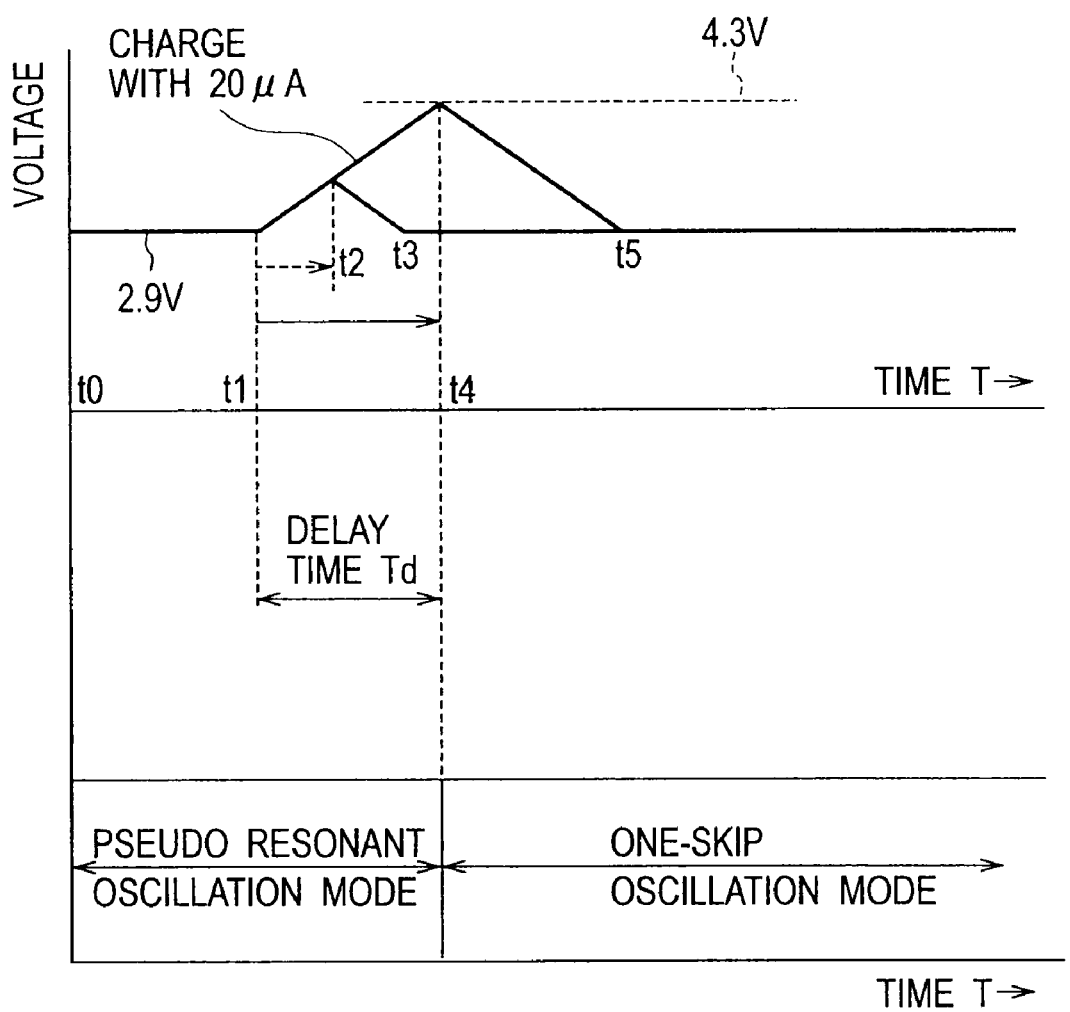
FIG. 7 is a timing chart illustrating operation of the switching power source apparatus of Embodiment 1.

Then, a clock synchronized with the gate pulse voltage $V_G$ to the switching element 3 is supplied to the D flip-flop 28 and the output signal $V_{MD}$ from the D flip-flop 28 changes from high to low. At this time, the bottom skip state tester 28c operates as illustrated in FIG. 7 that shows changes in the output voltage of the constant current operational amplifier 66 of the bottom skip state tester 28c.

The voltage $V_{MD}$ to the reset terminal of the D flip-flop 61 and the inverting input terminal of the NAND gate 62 changes from high to low. Before this change, an inverting output terminal /Q of the D flip-flop 61 is at high level and the input voltage $V_{ND}$ to the NAND gate 62 is also high.

When the voltage $V_{MD}$ changes from high to low, an output signal $V_{SK}$ from the NAND gate 62 changes from high to low and is supplied to the OR gate 64. A voltage $V_{SQO}$ to the other input terminal of the OR gate 64 is low, and therefore, an output $V_{SH}$ from the OR gate 64 changes from high to low and is supplied to the OR gate 65. An output signal $V_{SD1}$ from the OR gate 65 changes from high to low. This low-level signal turns on the p-type MOSFET 70 that short-circuits the biasing resistor 72 to increase a voltage $V_J$ to the non-inverting input terminal of the constant current operational amplifier 66.

The non-inverting input terminal of the constant current operational amplifier 66 has a threshold voltage of, for example, 4.3 V. The output of the constant current operational amplifier 66 is connected to the capacitor 75. Due to a time constant determined by the capacitor 75 and a constant output current from the constant current operational amplifier 66, an output voltage $V_{ADJ}$ increases from 3 V at t1 as illustrated in FIG. 7.

When the output voltage $V_{ADJ}$ exceeds the reference voltage 68 of 4.3 V at t4, an output signal $V_{SC}$ from the skip comparator 67 changes from low level to high level and is supplied to the set terminal of the S-R flip-flop 63. As results, the output terminal Q of the S-R flip-flop 63 becomes high and the inverting output terminal /Q thereof becomes low.

At this time, the comparator 81 outputs a high-level voltage, and therefore, the NOR gate 69 provides an output $V_{SRN}$ of low level to the reset terminal of the S-R flip-fop 63.

When the output $V_{CD}$ from the inverting output terminal /Q of the S-R flip-flop 63 changes from high to low, the clock input of the D flip-flop 61 receives a high-level signal. The voltage $V_{ND}$ to the input terminal D of the D flip-flop 61 is high, and therefore, the output voltage $V_{ND}$ from the inverting output terminal /Q thereof changes from high to low, to inform the OR gate 29 in the bottom skip operation tester 28b of the bottom skip state.

In FIG. 7, a period from t1 to t4 is a delay time (predetermined time) for testing if the bottom skip state is established.

At this time, the signal $V_{SQO}$ from the output terminal Q of the S-R flip-flop 63 changes from low level to high level and is supplied to the input terminal of the OR gate 64. Then, the OR gate 64 outputs the signal $V_{SH}$ of high level to the OR gate 65.

As results, the gate voltage of the MOSFET 70 changes from low to high, to turn off the MOSFET 70. This changes the threshold voltage at the non-inverting input terminal of the constant current operational amplifier 66 from 4.3 V to 3 V. The output voltage $V_{ADJ}$ of the constant current operational amplifier 66 decreases from 4.3 V to 3 V with a discharge time constant of the capacitor 75 (t4 to t5 in FIG. 7).

At this time, a reset comparator (RESET COMP) 88 secures the gate voltage of high level for the MOSFET 70 until the output voltage $V_{ADJ}$ from the constant current operational amplifier 66 decreases to a steady voltage of 2.9 V. This is achieved by latching an output voltage $V_{SR}$ of the comparator 81 at high level until the voltage $V_{ADJ}$ to the non-inverting input terminal of the comparator 81 decreases below the reference voltage 80 of 3 V.

Operation of the bottom skip state tester 28c is not affected by the operation of the comparator 81. This is because an output $V_{SN}$ from the NAND gate 82 becomes high when the output $V_{SH}$ from the OR gate 64 changes from high to low, so that a voltage to a set terminal of the S-R flip-flop 83 changes from high to low.

An output $V_{SQA}$ from an output terminal Q of the S-R flip-flop 83 is low and is supplied to the AND gate 84. Without regard to variations in the output $V_{SR}$ from the comparator 81, the AND gate 84 provides a low-level output $V_{SA}$ to the OR gate 65. Accordingly, the output $V_{SD1}$ from the OR gate 65 is not affected by the output $V_{SR}$.

Under the light load state, a maximum value in the drain current ID to the switching element 3 decreases to decrease a peak value of the voltage VOCP at the connection point of the current detecting resistor 9.

Then, in the bottom skip operation tester 28b, the output voltage $V_{CP}$ from the comparator 27 becomes low and the output signal $V_{MD}$ from the D flip-flop 28 changes from high to low. According to the low-level signal from the D flip-flop 28 and the low-level signal from the D flip-flop 61, the OR gate 29 outputs a low-level signal to the AND gate 52.

The output voltage $V_{AD}$ from the AND gate 52 changes from high to low. It is determined, therefore, that the bottom skip operation must be carried out and no high-level signal is provided to generate the gate signal $V_G$ for the switching element 3.

At this time, the low-level signal from the OR gate 29 turns off the MOSFET 34 in a voltage level changer 31, to switch the reference voltage to the inverting input terminal of the comparator 27 from a low reference voltage $V_{DTL}$ to a high reference voltage $V_{DTH}$. In synchronization with a second fall edge of the output signal $V_{BD}$ from the bottom detector 41, the output terminal Q of the second flip-flop 51 of the bottom skip controller 42 outputs a single pulse signal $V_{DF2}$.

The AND gate 52 outputs a low-level signal $V_{AD}$. Accordingly, in synchronization with the second fall edge of the output signal $V_{BD}$ from the bottom detector 41, the OR gate 53 outputs the single pulse OR signal VOR that increases up to high level to set the R-S flip-flop 23.

Accordingly, in synchronization with the second fall edge of the output signal $V_{BD}$ from the bottom detector 41, the drive signal $V_G$ provided by the R-S flip-flop 23 to the gate terminal of the switching element 3 changes from low to high to turn on the switching element 3. As results, the drain current ID to the switching element 3 linearly increases and the voltage VOCP at the connection point of the current detecting resistor 9 linearly increases.

At this time, the detection signal $V_{FB}$ from the output voltage detector 7 is lower than the low reference voltage $V_{DTL}$. When the voltage VOCP at the connection point of the current detecting resistor 9 reaches the voltage level of the detection signal $V_{FB}$, the current mode controlling converter 20 outputs a high-level signal V2 to reset the R-S flip-flop 23.

As results, the drive signal $V_G$ provided by the R-S flip-flop 23 to the gate terminal of the switching element 3 changes from high to low to change the switching element 3 from ON to OFF. In this way, the bottom skip operation is carried out in the light load state, to turn on the switching element 3 at a second minimum point detected in the drain-source voltage $V_{DS}$ during an OFF period of the switching element 3.

If the light load state returns to a normal load state during the period (t1 to t4 of FIG. 7) in which the bottom skip state tester 28c detects the light load state, a maximum value in the drain current ID to the switching element 3 increases to change the output $V_{CP}$ from the comparator 27 from low to high.

A clock synchronized with the gate pulse voltage $V_G$ to the switching element 3 is supplied to the D flip-flop 28, to change the output signal $V_{MD}$ from the D flip-flop 28 from low to high.

As results, the bottom skip state tester 28c cancels the detected bottom skip state and the output level of the NAND gate 62 changes from low to high. This changes the gate voltage to the MOSFET 70 from low to high. At t2, the reference input voltage $V_J$ to the constant current operational amplifier 66 is decreased, and at t3, the output voltage of the constant current operational amplifier 66 is returned to the steady voltage of 2.9 V.

As mentioned above, the switching power source apparatus according to Embodiment 1 shifts the pseudo resonant operation and the bottom skip operation from one to another when there is an input change or a load change. At this time, the present embodiment observes the load state of the apparatus, determines the operation to be carried out, and delays the start of the operation to be carried out. This stabilizes the switching operation of the switching element 3 and gently changes a peak current passed to the switching element 3, to avoid a sudden change. As results, the present embodiment 1 produces no magnetostrictive noise from the transformer 2 even if load conditions and input conditions vary.

If a sharp load change occurs under the light load state, the detection signal from the output voltage detector 7 increases the voltage $V_{FB}$ at the feedback terminal FB, to instantaneously release the bottom skip operation. This prevents a transitional drop in the output voltage Vout and stabilizes the output voltage Vout.

Embodiment 2

Figure 8:
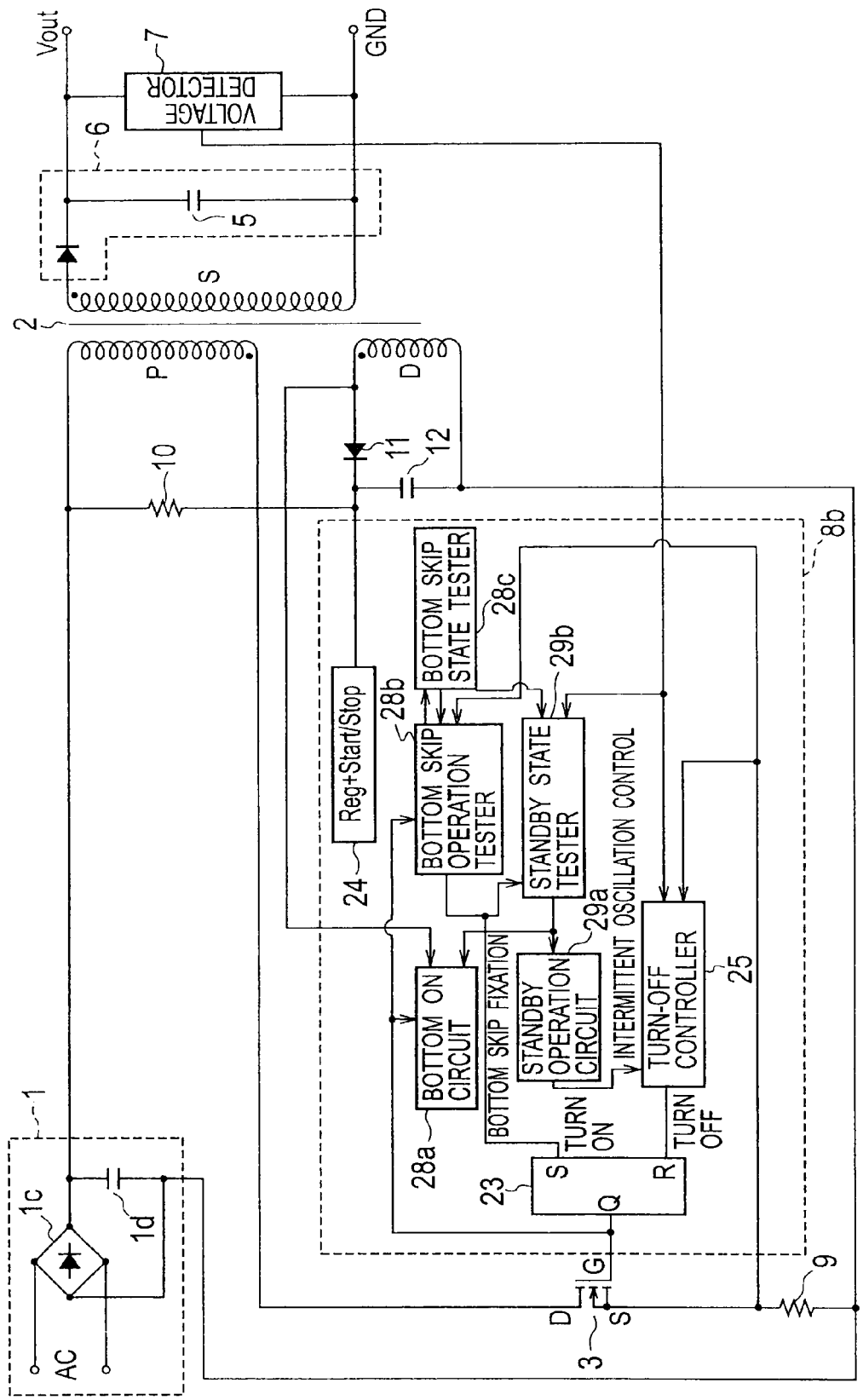
FIG. 8 is a circuit diagram illustrating a switching power source apparatus according to Embodiment 2 of the present invention.

FIG. 8 is a circuit diagram illustrating a switching power source apparatus according to Embodiment 2 of the present invention. This switching power source apparatus employs a controller 8b instead of the controller 8a of the switching power source apparatus of Embodiment 1 illustrated in FIG. 5.

The controller 8b includes a power source start/stop circuit (Reg+Start/Stop) 24, a turn-off controller 25, a bottom ON circuit 28a, a bottom skip operation tester 28b, a bottom skip state tester 28c, a standby operation circuit 29a, a standby state tester 29b, and an R-S flip-flop 23.

When the bottom skip operation tester 28b determines that the bottom skip operation must be carried out, the standby state tester 29b tests whether or not a standby state in which load on the switching power source apparatus is lighter than in the light load state has continued for a second predetermined time.

If the standby state tester 29b indicates that the standby state has continued for the second predetermined time, the standby operation circuit 29a starts a standby operation that fixes the bottom skip operation, carries out an intermittent oscillation operation, and controls the turn-off controller 25.

Operation to be carried out from the bottom skip operation when it is determined that the standby operation should be started will be explained with reference to FIG. 9.

Figure 9:
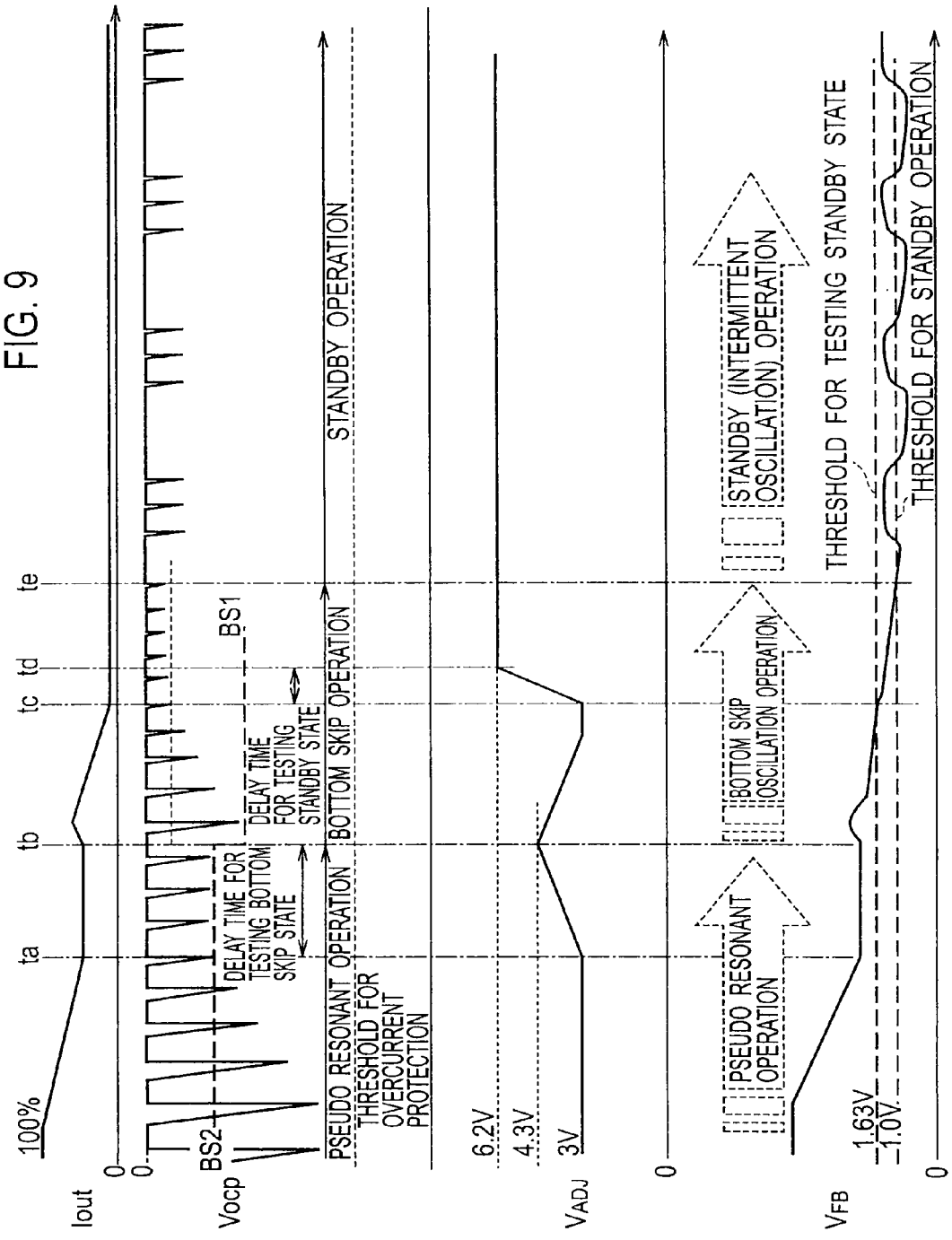
FIG. 9 is a timing chart illustrating operation of the switching power source apparatus of Embodiment 2.

In FIG. 9, IOUT is a load current (output current) and VOCP is a voltage of a current detecting resistor 9 produced by a drain current ID of a switching element 3. A period from 0 to ta is a period in which a heavy load current passes, a period from ta to tc is a period in which a load current is less than 50%, and a period after tc is a period in which a light load current passes.

In a period from 0 to tb, the pseudo resonant operation is carried out. In a period from tb to te, the bottom skip operation is carried out. In a period after te, the standby operation is carried out. A period from ta to tb is a delay time for testing the bottom skip state and a period from tc to td is a delay time for testing the standby state.

When a voltage $V_{ADJ}$ at a terminal ADJ (FIG. 10) reaches 4.3 V in the period from ta to tb, the bottom skip state tester 28c asserts the bottom skip state. Then, the bottom skip operation tester 28b shifts the pseudo resonant operation to the bottom skip operation. Thereafter, the voltage $V_{ADJ}$ at the terminal ADJ is returned to an original voltage of 3 V.

The load current Iout decreases, and at tc, a voltage $V_{FB}$ at a terminal FB (FIG. 10) decreases to a standby state threshold (for example, 1.63 V). The voltage $V_{ADJ}$ at the terminal ADJ increases to 6.2 V. Thereafter, the load current is unchanged, and at te, the voltage $V_{FB}$ drops below a standby operation threshold of 1.0 V. Then, the bottom skip operation is shifted to the standby operation (intermittent oscillation operation).

Figure 10:
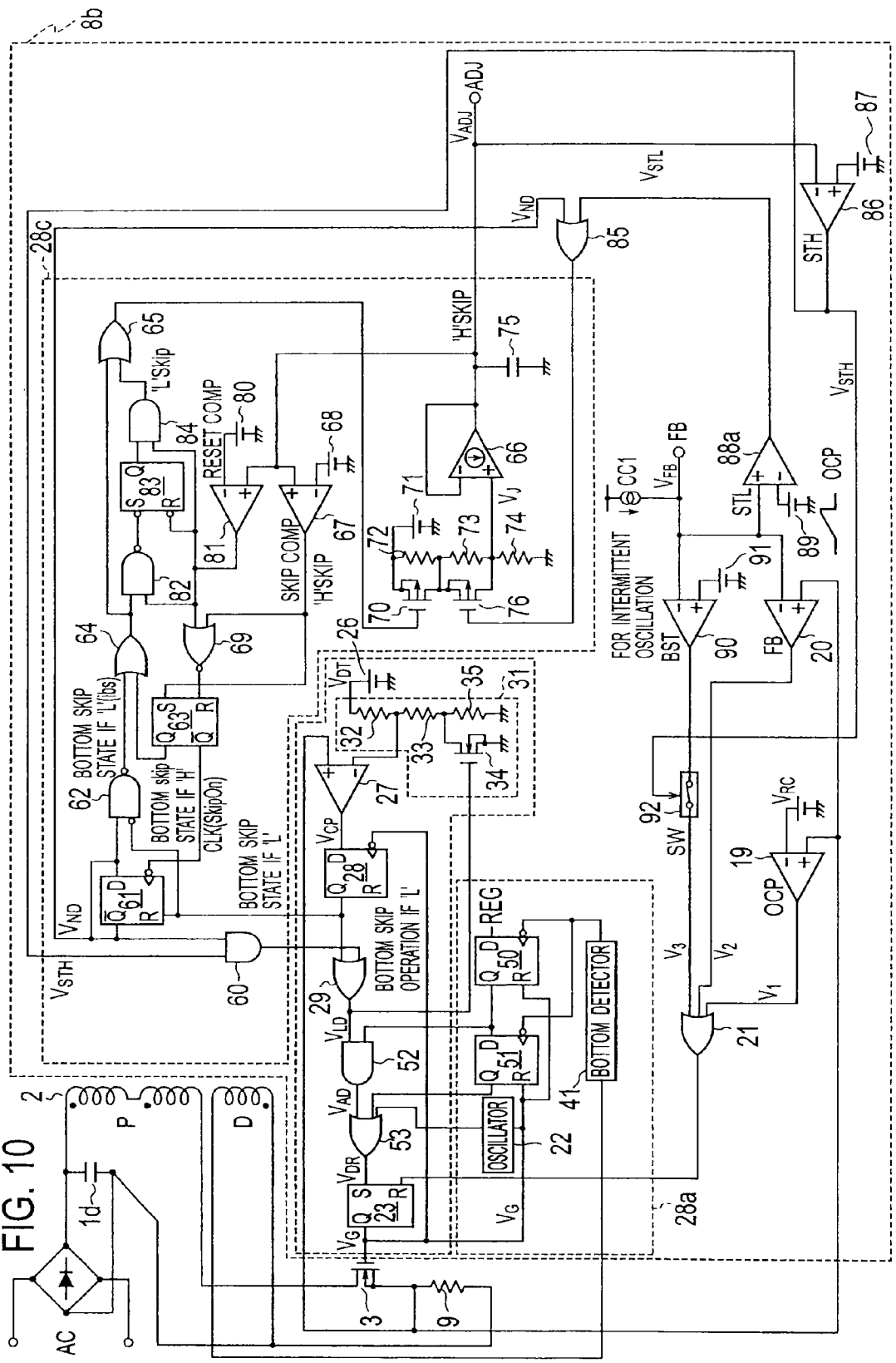
FIG. 10 is a circuit diagram illustrating a controller in the switching power source apparatus of Embodiment 2.

FIG. 10 is a circuit diagram illustrating the details of the controller 8b of the switching power source apparatus according to Embodiment 2. In addition to the elements of the controller 8a of Embodiment 1, the controller 8b of Embodiment 2 includes an AND gate 60, a p-type MOSFET 76, an OR gate 85, a comparator 86, the voltage $V_{ADJ}$ at the terminal ADJ, a reference voltage 87, a comparator 88a, a reference voltage 89, an intermittent oscillation comparator 90, a reference voltage 91, and a switch 92.

The AND gate 60, MOSFET 76, OR gate 85, comparator 86, comparator 88a, reference voltage 89, comparator 90, and the MOSFET 70, resistors 72, 73, and 74, constant current amplifier 66, and capacitor 75 in the bottom skip state tester 28c form the standby state tester 29b. The intermittent oscillation comparator 90 and switch 92 form the standby operation circuit 29a.

Operation of Embodiment 2 is basically the same as that of Embodiment 1 and is different therefrom in the below-mentioned points concerning the operation illustrated in FIG. 9.

When the load current Iout decreases below the level set for the bottom skip state and the voltage $V_{FB}$ at the terminal FB drops below 1.63 V, a voltage at a non-inverting input terminal of the comparator 88a becomes lower than 1.63 V. As a result, the output of the comparator 88a changes from high to low to supply a low-level signal $V_{STL}$ to an input terminal of the OR gate 85.

A signal $V_{ND}$ to the other input terminal of the OR gate 85 is at a voltage lower than that for the bottom skip state, and therefore, the output of the OR gate 85 changes to low to change the gate voltage of the MOSFET 76 to low, thereby turning on the MOSFET 76. The turned-on MOSFET 76 short-circuits the resistor 73 to increase a voltage at a non-inverting input terminal of the constant current operational amplifier 66 to 6.2 V (td in FIG. 9). The output of the constant current operational amplifier 66 charges the capacitor 75 with a constant current, to stabilize the voltage $V_{ADJ}$ at the terminal ADJ at 6.2 V.

The voltage $V_{ADJ}$ at the terminal ADJ is connected to an inverting input terminal of the comparator 86, and therefore, the voltage at the inverting input terminal exceeds the reference voltage 87 of 6.2 V. Then, the output of the comparator 86 changes from high to low, to change a voltage $V_{STH}$ to an input terminal of the AND gate 60 to low.

The output of the AND gate 60 is fixed at low level and is supplied to the bottom skip operation tester 28b to fix the bottom skip operation. At the same time, the output $V_{STH}$ of the comparator 86 changes the switch 92 from OFF to ON, so that an output from the comparator 90 is supplied as V3 to an input terminal of the OR gate 21.

At this time, the load current Iout is small and if the voltage $V_{FB}$ at the terminal FB is lower than 1.0 V, the comparator 90 provides a high-level output as V3, which is supplied through the switch 92 to the OR gate 21. The OR gate 21 provides a high-level output to reset an R-S flip-flop 23.

Then, the switching element 3 is changed from ON to OFF and the OFF state continues for a period in which the voltage $V_{FB}$ at the terminal FB is lower than 1.0 V. Thereafter, the voltage $V_{FB}$ at the terminal FB increases as an output voltage decreases, and only during a period in which the voltage $V_{FB}$ is above 1.0 V, the switching element 3 resumes the ON state. This is the intermittent oscillation operation.

As mentioned above, the switching power source apparatus according to Embodiment 2 shifts the bottom skip operation to the standby operation when there is an input variation or a load variation. At this time, the present embodiment 2 observes a load state, determines an operation to be carried out, and delays the start of the operation to be carried out. This stabilizes the switching operation of the switching element 3 and gently changes a peak current passing through the switching element 3, to avoid a sudden change. As a result, the present embodiment 2 produces no magnetostrictive noise from a transformer 2 even if load conditions and input conditions vary.

The constant current operational amplifier 66 according to any one of Embodiments 1 and 2 may serve as a variable constant-current source by changing a voltage supplied to the non-inverting input terminal thereof. FIG. 11 is a schematic view illustrating such a variable constant-current source.

At the start of the apparatus, the capacitor 75 is at 0 V to achieve a soft start operation until the capacitor 75 is charged to the voltage $V_{ADJ}$ (SS). In a normal state, the voltage $V_J$ to the non-inverting input terminal of the amplifier 66 is fixed at 3 V.

To detect the bottom skip state, the MOSFET 70 turns on and the voltage $V_J$ is changed to 4.3 V. When the bottom skip state is asserted, the MOSFET 70 turns off and the voltage $V_J$ returns to 3 V. If the standby state is detected in the bottom skip state, the MOSFET 76 turns on to change the voltage $V_J$ to 6.2 V.

The present invention is not limited to the switching power source apparatuses of Embodiments 1 and 2. According to Embodiments 1 and 2, the OR gate 65 is followed by the MOSFET 70, resistors 72 to 74, constant current operational amplifier 66, and capacitor 75. Instead of these elements, the OR gate 65 may be followed by a counter.

When the switching power source apparatus enters the light load state, the counter mentioned above receives a high-level signal from the OR gate 65, to start counting. When the counter counts the first predetermined time, a voltage of the capacitor 75, for example, 4.3 V is supplied to the comparators 67 and 81 to determine that the bottom skip state has continued for the first predetermined time.

According to Embodiments 1 and 2, the bottom detector 41 uses a voltage generated by the auxiliary winding D to detect a bottom of the drain voltage of the switching element 3. Instead, any device may be employed to detect a bottom of the drain voltage of the switching element 3.

According to Embodiments 1 and 2, the one-bottom skipping operation takes place to prevent a frequency increase in the light load state. It is possible to carry out a two-bottom skipping operation, a three-bottom skipping operation, or the like with additional logic circuits.

This application claims benefit of priority under 35USC §119 to Japanese Patent Application No. 2008-209666, filed on Aug. 18, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
   a series circuit connected to both ends of a DC power source and including a primary winding of a transformer and a switching element;
   a current detector configured to detect a current passing through one of the primary winding of the transformer and the switching element;
   an output rectifying-smoothing circuit configured to rectify and smooth a voltage generated by a secondary winding of the transformer and provide a DC output voltage; and
   a controller configured to generate a drive signal that controls an ON/OFF period of the switching element in such a way as to keep the DC output voltage at a predetermined value, the controller including:
   an edge detector configured to detect an edge of the drive signal when the switching element is switched from ON to OFF;
   a load tester configured to test, when the edge detector detects the edge of the drive signal, whether or not the switching power source apparatus is in a light load state according to a reference voltage and a voltage derived from a detection signal provided by the current detector;
   a bottom detector configured to detect a minimum point in a voltage across the switching element during an OFF period of the switching element;
   a bottom skip state tester configured to test, according to an output from the load tester, whether or not a bottom skip state has continued for a first predetermined time, the bottom skip state being asserted if the output of the load tester indicates the light load state; and
   a bottom skip operation tester configured to:
      if the load tester indicates that the apparatus is in a heavy load state, carry out a pseudo resonant operation that turns on the switching element at a first minimum point detected by the bottom detector; and
      if the load tester indicates the light load state and the bottom skip state tester indicates that the bottom skip state has continued for the first predetermined time, determine that a bottom skip operation is carried out and shift the pseudo resonant operation to the bottom skip operation that turns on the switching element at a second or later minimum point detected by the bottom detector, wherein
   the bottom skip state tester comprises:
      a variable voltage part configured to change, if the load tester indicates the light load state, a first voltage to a second voltage that is larger than the first voltage;
      a capacitor;
      a current source configured to pass a current corresponding to the second voltage set by the variable voltage part through the capacitor; and
      a time tester configured to determine that the bottom skip state has continued for the first predetermined time when a voltage across the capacitor charged by the current source reaches the second voltage from the first voltage.

2. The switching power source apparatus of claim 1, wherein:
   the variable voltage part changes the second voltage to the first voltage when the time tester determines that the bottom skip state has continued for the first predetermined time; and
   the current source discharges the capacitor with a current corresponding to the first voltage set by the variable voltage part, to thereby decrease the voltage across the capacitor from the second voltage to the first voltage.

3. The switching power source apparatus of claim 1, wherein:
   the variable voltage part cancels the bottom skip state determination if the load tester indicates the heavy load state within the first predetermined time and changes the second voltage to the first voltage; and
   the current source discharges the capacitor with a current corresponding to the first voltage set by the variable voltage part, to thereby decrease the voltage across the capacitor to the first voltage.

4. A switching power source apparatus comprising:
   a series circuit connected to both ends of a DC power source and including a primary winding of a transformer and a switching element;
   a current detector configured to detect a current passing through one of the primary winding of the transformer and the switching element;
   an output rectifying-smoothing circuit configured to rectify and smooth a voltage generated by a secondary winding of the transformer and provide a DC output voltage; and
   a controller configured to generate a drive signal that controls an ON/OFF period of the switching element in such a way as to keep the DC output voltage at a predetermined value, the controller including:
   an edge detector configured to detect an edge of the drive signal when the switching element is switched from ON to OFF;
   a load tester configured to test, when the edge detector detects the edge of the drive signal, whether or not the switching power source apparatus is in a light load state according to a reference voltage and a voltage derived from a detection signal provided by the current detector;
   a bottom detector configured to detect a minimum point in a voltage across the switching element during an OFF period of the switching element;
   a bottom skip state tester configured to test, according to an output from the load tester, whether or not a bottom skip state has continued for a first predetermined time, the bottom skip state being asserted if the output of the load tester indicates the light load state; and a bottom skip operation tester configured to:
    if the load tester indicates that the apparatus is in a heavy load state, carry out a pseudo resonant operation that turns on the switching element at a first minimum point detected by the bottom detector; and
    if the load tester indicates the light load state and the bottom skip state tester indicates that the bottom skip state has continued for the first predetermined time, determine that a bottom skip operation is carried out and shift the pseudo resonant operation to the bottom skip operation that turns on the switching element at a second or later minimum point detected by the bottom detector,
wherein the bottom skip state tester comprises:
    a counter configured to start counting the first predetermined time when the load tester indicates the light load state; and
    a time tester configured to determine that the bottom skip state has continued for the first predetermined time when the counter counts the first predetermined time.

5. A switching power source apparatus comprising:
    a series circuit connected to both ends of a DC power source and including a primary winding of a transformer and a switching element;
    a current detector configured to detect a current passing through one of the primary winding of the transformer and the switching element;
    an output rectifying-smoothing circuit configured to rectify and smooth a voltage generated by a secondary winding of the transformer and provide a DC output voltage; and
    a controller configured to generate a drive signal that controls an ON/OFF period of the switching element in such a way as to keep the DC output voltage at a predetermined value, the controller including:
    an edge detector configured to detect an edge of the drive signal when the switching element is switched from ON to OFF;
    a load tester configured to test, when the edge detector detects the edge of the drive signal, whether or not the switching power source apparatus is in a light load state according to a reference voltage and a voltage derived from a detection signal provided by the current detector;
    a bottom detector configured to detect a minimum point in a voltage across the switching element during an OFF period of the switching element;
    a bottom skip state tester configured to test, according to an output from the load tester, whether or not a bottom skip state has continued for a first predetermined time, the bottom skip state being asserted if the output of the load tester indicates the light load state;
    a bottom skip operation tester configured to:
        if the load tester indicates that the apparatus is in a heavy load state, carry out a pseudo resonant operation that turns on the switching element at a first minimum point detected by the bottom detector; and
        if the load tester indicates the light load state and the bottom skip state tester indicates that the bottom skip state has continued for the first predetermined time, determine that a bottom skip operation is carried out and shift the pseudo resonant operation to the bottom skip operation that turns on the switching element at a second or later minimum point detected by the bottom detector;
    a standby state tester configured to test, according to an output from the bottom skip state tester, whether or not a standby state has continued for a second predetermined time, the standby state being a state in which load on the switching power source apparatus is lighter than in the light load state; and
    a standby operator configured to start a standby operation when the standby state has continued for the second predetermined time, the standby operation fixing the bottom skip operation and carrying out an intermittent oscillation operation,
wherein the standby state tester comprises:
    a variable voltage part configured to change, if the bottom skip state tester indicates the standby state, a first voltage to a third voltage that is larger than the first voltage;
    a capacitor;
    a current source configured to pass a current corresponding to the third voltage set by the variable voltage part through the capacitor; and
    a time tester configured to determine that the standby state has continued for the second predetermined time when a voltage across the capacitor charged by the current source reaches the third voltage from the first voltage.

* * * * *